(12) United States Patent
Yasuki

(10) Patent No.: US 11,431,940 B2
(45) Date of Patent: Aug. 30, 2022

(54) BROADCAST SIGNAL RECEIVING APPARATUS AND BROADCAST SIGNAL RECEIVING METHOD

(71) Applicants: Hisense Visual Technology Co., Ltd., Qingdao (CN); TVS REGZA Corporation, Aomori (JP)

(72) Inventor: Seijiro Yasuki, Aomori (JP)

(73) Assignees: Hisense Visual Technology Co., Ltd., Qingdao (CN); TVS REGZA Corporation, Aomori (JP)

( * ) Notice: Subject to any disclaimer, the term of this patent is extended or adjusted under 35 U.S.C. 154(b) by 0 days.

(21) Appl. No.: 17/319,710

(22) Filed: May 13, 2021

(65) Prior Publication Data

US 2021/0266491 A1 Aug. 26, 2021

Related U.S. Application Data

(63) Continuation of application No. PCT/CN2019/127206, filed on Dec. 20, 2019.

(30) Foreign Application Priority Data

Dec. 20, 2018 (JP) .............................. JP2018-238923
Dec. 20, 2018 (JP) .............................. JP2018-238924
Dec. 20, 2018 (JP) .............................. JP2018-238925

(51) Int. Cl.
*H04N 5/455* (2006.01)
*H04N 21/434* (2011.01)
(Continued)

(52) U.S. Cl.
CPC ......... *H04N 5/455* (2013.01); *H04N 21/4347* (2013.01); *H04N 21/4348* (2013.01); *H04N 21/4383* (2013.01); *H04N 21/44004* (2013.01)

(58) Field of Classification Search
CPC ............... H04N 5/445; H04N 21/4347; H04N 21/4348; H04N 21/4383; H04N 21/44004
(Continued)

(56) References Cited

U.S. PATENT DOCUMENTS 6,698,020 B1 * 2/2004 Zigmond ............. H04N 21/812
725/34
8,483,547 B2 * 7/2013 Yokoo ...................... H04N 5/85
386/249
(Continued)

FOREIGN PATENT DOCUMENTS

CN 101198018 A 6/2008
CN 104661055 A 5/2015
(Continued)

*Primary Examiner* — Dominic D Saltarelli
(74) *Attorney, Agent, or Firm* — Workman Nydegger

(57) ABSTRACT

Provided are a broadcast signal receiving apparatus and a broadcast signal receiving method, capable of providing CMs to make the CMs have greater similarity to viewing program content. The broadcast signal receiving apparatus of the present embodiment comprises: a receiving element used for receiving and demodulating broadcast content; a CM substitute time period information acquisition element used for acquiring a specific assigned time period for a CM substitute among one or more CM during the playing of the broadcast content; a CM substitute acquisition element used for acquiring at least one CM substitute associated with the broadcast content from external device; and a CM selection element used for playing the CM substitute during a specific assigned time period for the CM substitute on the basis of the time period information for the CM substitute.

13 Claims, 9 Drawing Sheets

(51) Int. Cl.
*H04N 21/438* (2011.01)
*H04N 21/44* (2011.01)

(58) Field of Classification Search
USPC .......................................................... 375/240
See application file for complete search history.

(56) References Cited

U.S. PATENT DOCUMENTS

2017/0251242 A1* 8/2017 Wang ................. H04N 21/4532
2018/0255330 A1* 9/2018 Hundemer ......... H04N 21/2665
2019/0028778 A1* 1/2019 Liassides ........... G06Q 30/0276

FOREIGN PATENT DOCUMENTS

CN 104780449 A 7/2015
WO WO-2013053232 A1 4/2013

\* cited by examiner

BROADCAST SIGNAL RECEIVING APPARATUS AND BROADCAST SIGNAL RECEIVING METHOD

CROSS-REFERENCE TO RELATED APPLICATIONS

The present application is a continuation of International Application No. PCT/CN2019/127206 filed Dec. 20, 2019, which claims priority to Japanese Patent Application No. 2018-238923 filed Dec. 20, 2018, Japanese Patent Application No. 2018-238924 filed Dec. 20, 2018 and Japanese Patent Application No. 2018-238925 filed Dec. 20, 2018. The entire disclosure of the above applications are incorporated herein by reference.

FIELD

The present disclosure relates to an apparatus for receiving a broadcast signal and a method thereof

BACKGROUND

This section provides background information related to the present disclosure which is not necessarily prior art.

A receiving apparatus capable of connecting to a network has a function of displaying an addressable commercial message (or replacement commercial message) (hereinafter CM). The addressable CM is the best CM consistent with the preference of a viewer (actually being a receiving apparatus). The function of displaying the CM substitute independently serves each viewer of the receiving apparatus. It should be noted that the preference of the viewer actually may be referred to as an attribute of the receiving apparatus determined according to a viewing history of the receiving apparatus.

Patent references: Japanese Publication No. 2002-518946.

There is a need for a further technology for making a CM substitute more effective. For example, even if the preference of the viewer is known and a recommended CM that should be recommended to the viewer can be determined, the viewer sometimes wants to avoid the CM substitute if content of the recommended CM is not matched with content of a broadcast program (or content). For example, when there are multiple recommended CMs, a CM inconsistent with the broadcast program (or content) may be issued.

Therefore, the present disclosure aims to provide an apparatus for receiving a broadcast signal and a method thereof, which allows to make the CMs have greater similarity (high correlation) to content of viewing program (content hereinafter).

SUMMARY

This section provides a general summary of the disclosure, and is not a comprehensive disclosure of its full scope or all of its features.

In a first aspect, the present application provides an apparatus for receiving a broadcast signal, including: a receiving element, configured to receive and demodulate broadcast content; a CM substitute time period information acquisition element, configured to acquire a specific assigned time period for a CM substitute among one or more CMs during the playing of the broadcast content; a CM substitute storage memory, configured to acquire and store a CM substitute associated with the broadcast content and the preference of a viewer from an external element; a CM selection element, configured to play the CM substitute in a specific assigned time period for the CM substitute based on the time period information for the CM substitute; and a control element, configured to monitor remaining capacity of the CM substitute storage memory, and store a CM substitute with a high priority while the CM substitute is stored in the CM substitute storage memory.

In a second aspect, the present application provides another apparatus for receiving a broadcast signal, including: a receiving element, configured to receive and demodulate broadcast content; a CM substitute time period information acquisition element, configured to acquire a specific assigned time period for a CM substitute among one or more CM during the playing of the broadcast content; a CM substitute storage memory, configured to acquire and store a CM substitute associated with the broadcast content and the preference of a viewer from an external element; a CM selection element, configured to play the CM substitute in a specific assigned period for the CM substitute based on the time period information for the CM substitute; and a control element, configured to monitor remaining capacity of the CM substitute storage memory, and store a CM substitute with a high priority while the CM substitute is stored in the CM substitute storage memory.

In an implementation, the CM substitute is sent from an external server.

In an implementation, the CM substitute is sent from the external server according to limitation of the remaining capacity.

In an implementation, the control element monitors the remaining capacity of the CM substitute storage memory, and stores CM substitutes with high priorities when the remaining capacity is not enough to store all CM substitutes.

In a third aspect, the present application provides another apparatus for receiving a broadcast signal, including: a receiving element, configured to receive and demodulate broadcast content; a CM substitute time period information acquisition element, configured to acquire a specific assigned time period for a CM substitute among one or more CMs during the playing of the broadcast content; a CM substitute storage memory, configured to acquire and store a CM substitute associated with the broadcast content and the preference of a viewer from an external element; a CM selection element, configured to play the CM substitute in a specific assigned time period for the CM substitute based on the time period information for the CM substitute; and a control element, configured to notify remaining capacity of the CM substitute storage memory to an external server, and store one or more CM substitutes sent from the external server according to the remaining capacity in the CM substitute storage memory.

In an implementation, the control element notifies the remaining capacity of the CM substitute storage memory to the external server, and stores a CM substitute with a high priority among multiple CM substitutes sent from the external server in the CM substitute storage memory.

In a fourth aspect, the present application provides a method for receiving a broadcast signal, applied to a control element of a broadcast signal receiving apparatus, including: acquiring a specific assigned time period information for a CM substitute among the one or more CMs during the playing of the broadcast content; collecting and generating a view log of a view history obtained after viewing the broadcast content; acquiring a CM substitute associated with the broadcast content from an external element for a CM storage memory; selecting the CM substitute for playing in a specific assigned period based on the time period information for the CM substitute; and monitoring remaining capacity of the CM storage memory, and storing a CM substitute with a high priority while the CM substitute is stored in the CM storage memory.

In an implementation, storing the CM substitute with the high priority includes: storing the CM substitute with the high priority while the remaining capacity is not enough to store all CM substitutes.

In a fifth aspect, the present application provides another method for receiving a broadcast signal, including: acquiring a specific assigned time period information for a CM substitute among the one or more CMs during the playing of the broadcast content; collecting and generating a view log of a view history obtained after viewing the broadcast content; acquiring a CM substitute associated with the broadcast content from an external element for a CM storage memory; selecting the CM substitute for playing in a specific assigned time period based on the time period information for the CM substitute; and notifying remaining capacity of the CM storage memory to an external server, and storing a certain number of CM substitutes sent from the external server according to limitation of the remaining capacity in the CM storage memory. Storing the certain number of CM substitutes sent from the external server according to limitation of the remaining capacity in the CM storage memory refers to storing one or more CM substitutes sent from the external server according to limitation of the remaining capacity in the CM storage memory.

In an implementation, storing the certain number of CM substitutes sent from the external server according to limitation of the remaining capacity in the CM storage memory, includes: storing a CM substitute with a high storage priority among the certain number of CM substitutes sent from the external server according to limitation of the remaining capacity in the CM storage memory. Storing the CM substitute with the high storage priority among the certain number of CM substitutes sent from the external server according to limitation of the remaining capacity in the CM storage memory refers to storing the CM substitutes sent from the external server according to limitation of the remaining capacity in the CM storage memory according to a priority order.

In a sixth aspect, a computer readable storage medium is provided. The computer readable storage medium stores instructions, and the instructions are executed on a computer to cause the computer to perform the method of any one of the implementations of the fourth to fifth aspects.

In a seventh aspect, a computer readable storage medium is provided. The computer readable storage medium stores instructions, and the instructions are executed on a computer to cause the computer to perform the method of any one of the implementations of the fourth to fifth aspects.

In an eighth aspect, a computer program product storing instructions is provided. The instructions are executed on a computer to cause the computer to perform the method of any one of the implementations of the fourth to fifth aspects.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
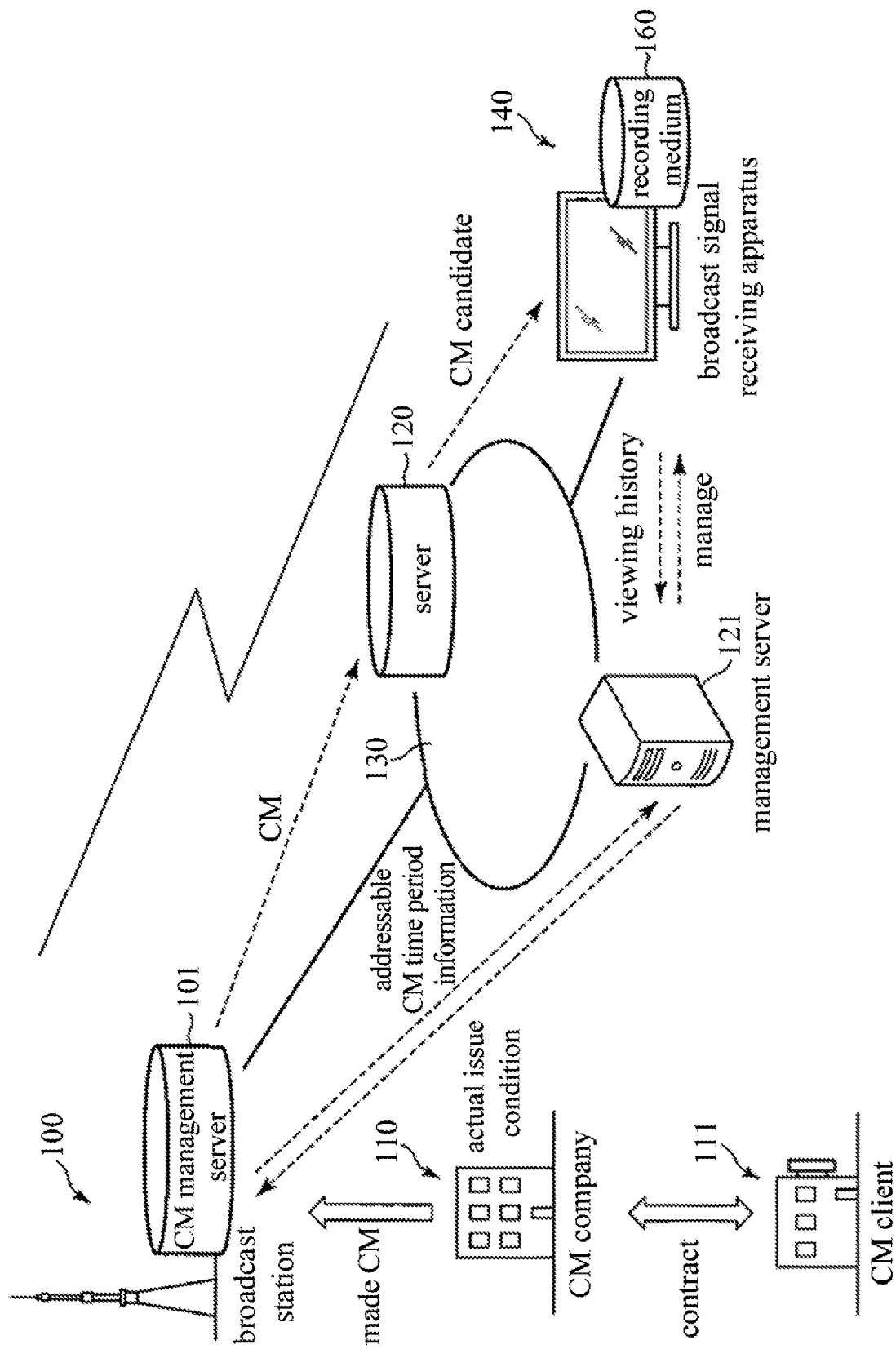
FIG. 1 is a diagram showing a structure example of a CM substitute system including a broadcast signal receiving apparatus of embodiments of the present disclosure.

FIG. 1 is a diagram showing a structure example of a CM substitute system used in the embodiments of the present disclosure. The CM substitute system includes: a broadcast station (i.e., broadcast signal sending apparatus) 100, a broadcast signal receiving apparatus 140, a server for issuing CM 120 and a management server 121.

The broadcast signal receiving apparatus 140 is configured to receive one or more programs broadcasted from the broadcast station 100. The broadcast signal receiving apparatus 140 includes a CM replacement apparatus 330 (described later) of the embodiments of the present disclosure. The broadcast station 100 and the broadcast signal receiving apparatus 140 are connected with the server 120 (also referred to as a CM insertion server) and the management server 121 via a network 130. In addition, the broadcast signal receiving apparatus may be connected with a coordination server via the network 130.

The broadcast station 100 may be a base station, where the base station arranges programs and broadcasts the arranged programs to the broadcast signal receiving apparatus 140 via broadcast signals. The broadcast station 100 may be referred to as broadcast signal sending apparatus.

The broadcast station 100 includes a CM management server 101 for storing and managing CMs made by a CM company 110. The broadcast station 100 inserts and arranges the CMs stored in the CM management server 101 into one or more broadcasted programs which are broadcasted or sent as a series of video streams and audio streams to the broadcast signal receiving apparatus 140 via broadcast signals.

It should be noted that the CM company 110, for example, makes the CMs according to an agreement from a CM client (referred to as a client entrusting the CM company 110 to make CMs, etc.) 111, and registers the CMs to the CM management server 101 of the broadcast station 100. In other words, in an implementation, the CM company 110 makes the CMs according to the agreement from the CM client 111, and registers the CMs to the CM management server 101 of the broadcast station 100, where the CM client 111 is the client entrusting the CM company 110 to make the CMs, etc.

In addition, the broadcast station 100 is able to connect with the network 130, and is connected to the server 120 and the management server 121 via the network 130.

The server 120 is a server as follows: storing one or more CM substitutes sent from the CM management server 101 connected via the network 130 and issuing the one or more stored CM substitutes in response to a request from the broadcast signal receiving apparatus 140. The CM substitutes may be sent from the CM company 110. In other words, the server 120 stores the one or more CM substitutes sent from the CM management server 101 and issues the one or more stored CM substitutes in response to a request from the broadcast signal receiving apparatus 140, where the server 120 is connected to the CM management server 101 via the network 130.

The management server 121 is configured to provide an additional service associated with a program received by the broadcast signal receiving apparatus 140. That is to say, the management server 121 is used to provide the additional service associated with the program received by the broadcast signal receiving apparatus 140. The additional service provided by the management server 121 is, for example, the following service: making the broadcast signal receiving apparatus 140 replace a CM inserted in the program with the CM substitute and provide the CM substitute for a user viewing the program. In other words, providing the additional service refers to providing a CM time period during which the CM substitute is playing to the broadcast signal receiving apparatus 140. The CM time period during which the CM may be replaced with the CM substitute is based on CM substitute time period information sent by the CM management server 101 of the broadcast station 100, where the CM substitute is provided by the management server 121 to the broadcast signal receiving apparatus 140. In other words, the CM time period during which the CM may be replaced with the CM substitute may be determined based on the CM substitute time period information sent by the CM management server 101. It should be noted that the CM substitute time period information may be sent together with a broadcast signal, or may also be sent via the management server 121 and/or the CM issuing server 120.

In addition, the management server 121 has a function of collecting a view history (or history records) of the broadcast signal receiving apparatus 140. The broadcast signal receiving apparatus 140 records how the CM substitute replaces the CM inserted in the program in the view history, and sends the view history. In other words, the broadcast signal receiving apparatus 140 records how CM substitute replaces the CM inserted in the program in the view history and send the view history to the management server 121.

The broadcast signal receiving apparatus 140 is an apparatus for receiving one or more programs broadcasted from the broadcast station 100 via the broadcast signal. In addition, the broadcast signal receiving apparatus 140 is able to connect with the network 130, and is connected with the server 120 via the network 130. The broadcast signal receiving apparatus 140 stores one or more CM substitutes issued from the server 120 in a recording medium 160 (including a CM storage memory).

In addition, in order to receive the additional service related to the broadcasted program, the broadcast signal receiving apparatus 140 may configure the connection with the management server 121 via, for example, a function setting interface of the broadcast signal receiving apparatus 140. The broadcast signal receiving apparatus 140, for example, is able to register information required for connection with the management server 121, such as inherent information (i.e., device ID) of the broadcast signal receiving apparatus 140, family conditions of the user (including genders and ages of family members) using the broadcast signal receiving apparatus 140, etc. to the management server 121, based on operations of a user on the function setting interface. Thus, the management server 121, for example, can uniquely identify each broadcast signal receiving apparatus 140 via the device ID of the broadcast signal receiving apparatus 140.

Therefore, the broadcast signal receiving apparatus 140 registers the information required for connection with the management server 121 via the function setting interface, so as to receive various additional services, associated with the program received via the broadcast signal, from the management server 121.

In addition, the broadcast signal receiving apparatus 140 includes the CM replacement apparatus of the present embodiments. The broadcast signal receiving apparatus 140 has functions as follows: selecting a best CM substitute from CM substitutes stored in the recording medium 160 via the CM replacement apparatus and displaying the best CM substitute. Meanwhile, the broadcast signal receiving apparatus 140 displays the selected best CM substitute, which needs to match with the time period for CM substitute sent from the management server 121, and can adaptively provide the selected best CM substitute to a viewer which is viewing the program.

It should be noted that FIG. 1 merely illustrates one broadcast signal receiving apparatus 140, but it is not limited to one. When there are multiple broadcast signal receiving apparatuses 140, the broadcast signal receiving apparatuses 140 are managed by the management server 121 via respective device IDs of the broadcast signal receiving apparatuses 140.

Figure 2:
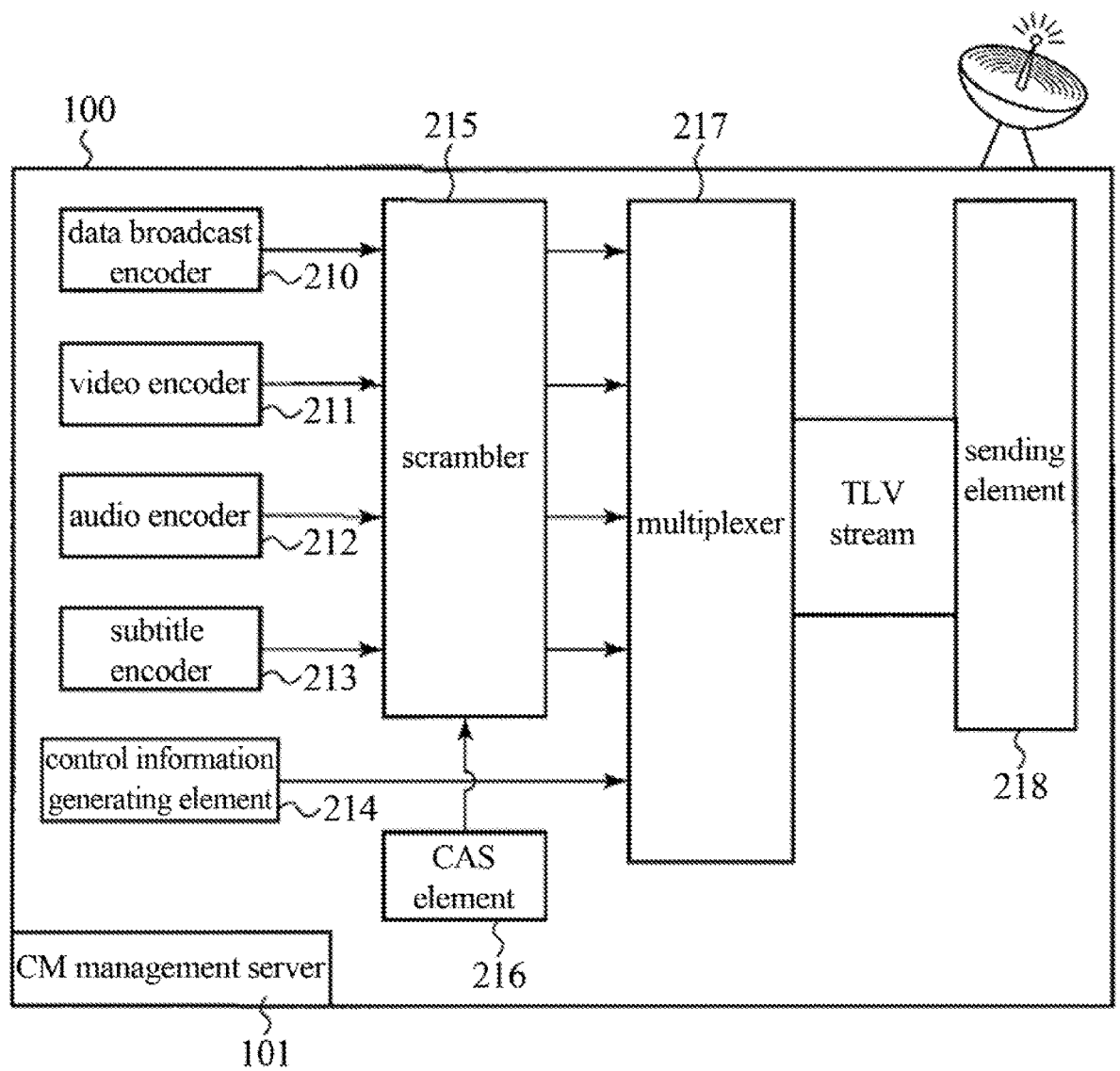
FIG. 2 is a diagram showing a structure example of a broadcast station (i.e., broadcast signal sending apparatus).

FIG. 2 is a diagram showing a structure example of the broadcast station (broadcast signal sending apparatus) 100. The broadcast station 100 encodes image data, audio data, etc., of a program inserted and arranged with a CM stored in the CM management server 101, and sends the encoded data as a broadcast signal.

A data broadcast encoder 210 is configured for encoding data of a data broadcast associated with the arranged program. The data broadcast encoder 210 encodes the data of the data broadcast.

A video encoder 211 is configured for encoding video data of the arranged program. The image encoder 211 encodes the video data of the arranged program.

An audio encoder 212 is configured for encoding audio data of the arranged program. The audio encoder 212 encodes the audio data of the arranged program.

A subtitle encoder 213 is configured for encoding subtitle data of the arranged program. The subtitle encoder 213 encodes the subtitle data of the arranged program.

A control information generating element 214 is configured for generating control information for Type Length Value (TLV) packet and control information for MPEG Media Transport (MMT). The control information for TLV packet refers to control information (also called TLV signaling information (TLV-SI)) related to multiplexing of IP packet, and provides information for selecting channels, and corresponding information of IP addresses and services. In addition, the control information for MMT refers to control information (also called MMT-SI) associated with the structure of MMT components and broadcast services. The control information generating element 214 generates signals including the control information for TLV packet and the control information for MMT, and the control information relates to the program serving as an encoding object of the audio encoder 212 and the image encoder 211.

A scrambler 215 has a following function: working with a Conditional Access System (CAS) element 216 to scramble encoded audio data output from the audio encoder 212 and encoded video data output from the image encoder 211.

The CAS element 216 is an element for generating a secret key used by the scrambler 215 during scrambling.

A multiplexer 217 has a following function: multiplexing, according to MMT/TLV manner, a data broadcast stream encoded by the data broadcast encoder 210, an video stream encoded by the image encoder 211, an audio stream encoded by the audio encoder 212, a subtitle stream encoded by the subtitle encoder 213, and the control information generated by the control information generating element 214. The multiplexer 217 generates a TLV stream obtained by multiplexing the audio stream, the image stream and the control information for TLV packet and for MMT.

A sending element 218 is configured for sending a broadcast signal consisting of TLV stream as a broadcast wave. The sending element 218 performs modulation such as 16APSK and encoding processing such as error correction coding on the TLV stream generated from the multiplexer 217 during transmission and sends the processed TLV stream as the broadcast wave.

Figure 3:
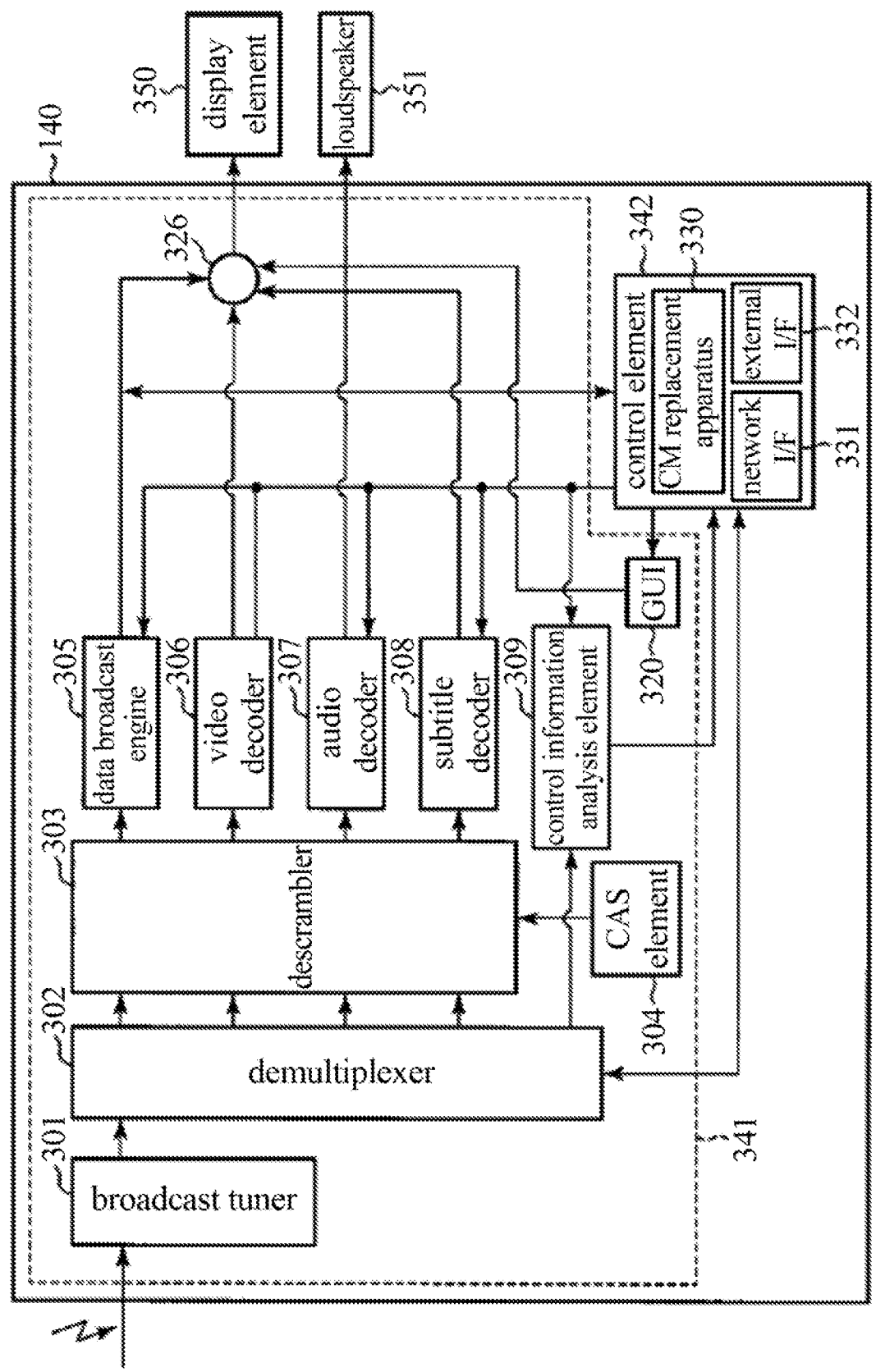
FIG. 3 is a diagram showing a structure example of a broadcast signal receiving apparatus (element) of embodiments.

FIG. 3 is a diagram schematically showing structure of the broadcast signal receiving apparatus (or element) 140 of the embodiments of the present disclosure. The broadcast signal receiving apparatus 140 includes a basic function 341 serving as a receiving function for receiving a broadcast signal and a control element 342.

The basic function 341 includes: a broadcast tuner 301, a demultiplexer 302, a descrambler 303, a CAS element 304, a data broadcast engine 305, a video decoder 306, an audio decoder 307, a subtitle decoder 308, a control information analysis element 309, a GUI 320 and a synthesizer 326.

The tuner 301 is configured for receiving a broadcast signal (TLV stream) via broadcast signals. The broadcast signal received by the tuner 301 is input into the demultiplexer 302.

The demultiplexer 302 is configured for demultiplexing the multiplexed TLV stream into a data broadcast stream, a video stream, an audio stream, a subtitle stream and control information. The demultiplexer 302 inputs the demultiplexed data broadcast stream, video stream, audio stream and subtitle stream into the descrambler 303, and inputs a control information SI signal into the control information analysis element 309.

The descrambler 303 has functions as follows: working with the CAS element 304 to descramble the input data broadcast stream, video stream, audio stream and subtitle stream. The descrambler 303 inputs the descrambled data broadcast stream into the data broadcast engine 305, inputs the video stream into the video decoder 306, inputs the audio stream into the audio decoder 307 and inputs the subtitle stream into the subtitle decoder 308.

The CAS element 304 is configured for generating a secret key used by the descrambler 303 during descrambling.

The data broadcast engine 305 is configured for performing receiving processing on the input data broadcast stream. The data broadcast engine 305 converts the received data broadcast stream into data for display and sends the data for display to the synthesizer 326. The data for data broadcast sent to the synthesizer 326 are synthesized with video data etc. and displayed on a display element 350.

The video decoder 306 is configured for decoding the input video stream. The video decoder 306 decodes the video stream and generates a signal displayed on the display element 350.

The audio decoder 307 is configured for decoding the input audio stream. The audio decoder 307 decodes the audio stream and generates a signal output to a loudspeaker 351. The subtitle decoder 308 decodes the subtitle stream and generates a signal displayed on the display element 350.

The synthesizer 326 synthesizes the decoded video signal, subtitle signal and signal for data broadcast and outputs the synthesized signal to the display element 350. Additionally, the decoded audio signal is output to the loudspeaker 351.

The control information analysis element 309 analyzes a SI signal as control information of a broadcast signal. The control information analysis element 309 analyzes the SI signal, and sends the analysis result to the control element 342.

The control element 342 controls overall actions of the broadcast signal receiving apparatus 140. In addition, the control element 342 retains the CM replacement apparatus 330 in the embodiments of the present disclosure inside and controls the CM replacement apparatus 330. Additionally, the control element 342 further controls a network I/F 331 serving as I/F of the network 130 and external input I/F 332 serving as a connection interface I/F of an external device.

In addition, the control element 342 performs controls as follows: selecting a best CM substitute most suitable for a viewer of the broadcast signal receiving apparatus 140 from CM substitutes stored in the recording medium 160 according to a replacement control signal output from the CM replacement apparatus 330, and replacing a CM from a time period which indicates by a CM substitute time period received from the management server 121 and displaying the selected CM substitute.

Figure 4:
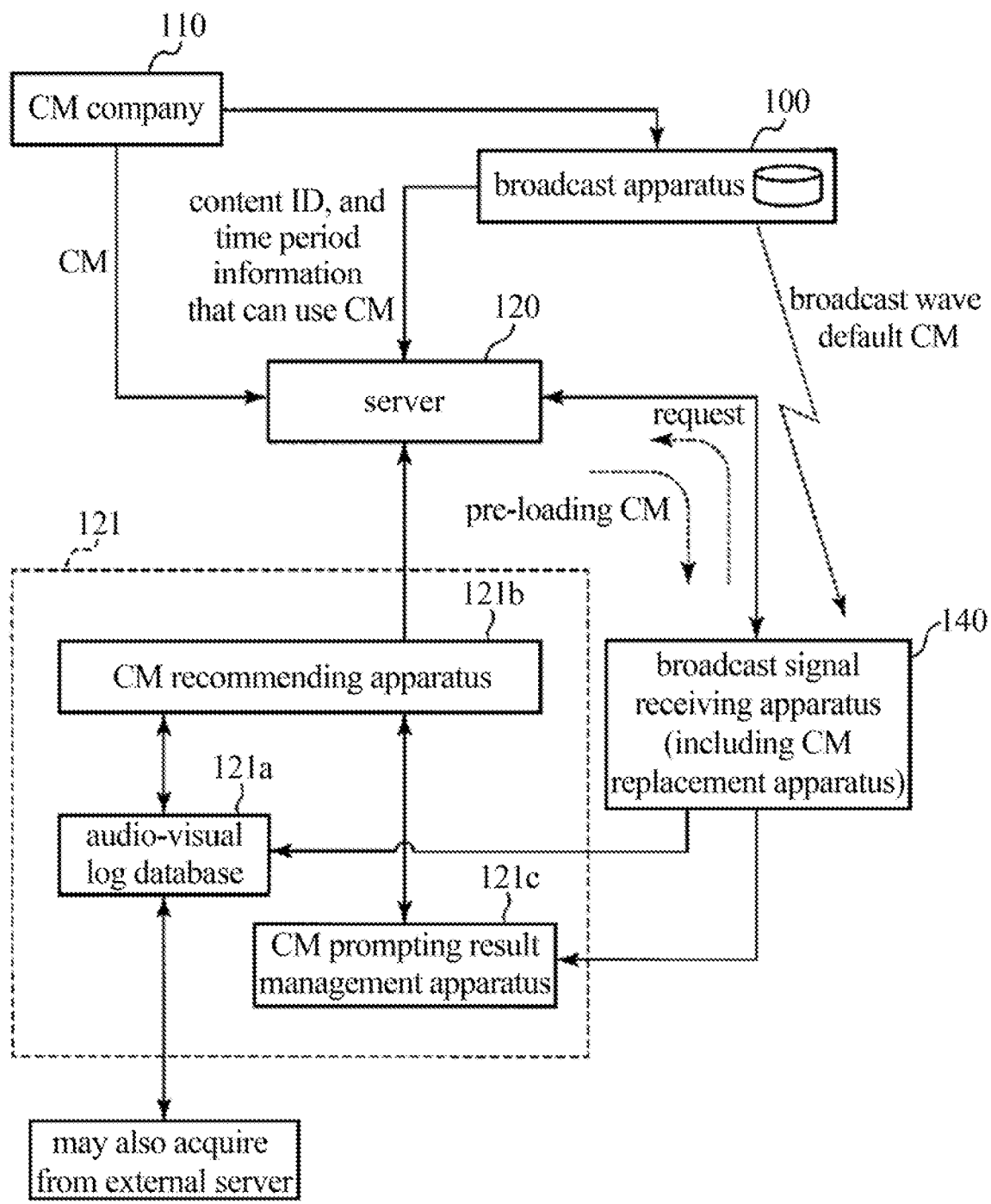
FIG. 4 is a diagram showing extracted main elements of a CM substitute system including a broadcast signal receiving apparatus of the embodiments.

FIG. 4 is a diagram omitting a network system in the structure of FIG. 1 and simplifying a structure example of the CM substitute system.

The broadcast apparatus 100 sends broadcast content, a content ID and a CM prompting timing (CM time period information) to the broadcast signal receiving apparatus (television receiver) 140. The content ID uniquely identifies the broadcast content, and the CM prompting timing is a signal for indicating a prompting time of a CM contained in the broadcast content and indicating a time period in which a CM substitute can be inserted. For example, CM time period information may be sent by a management server 121, e.g., via a network transceiving apparatus 121-4 of the management server 121. Herein, the CM time period information does not determine actual insertion of the CM substitute, and a default CM contained in a broadcast signal is prompted (displayed) sometimes in the broadcast signal receiving apparatus 140.

The broadcast signal receiving apparatus 140 sends the content ID and a receiving apparatus ID of the broadcast signal receiving apparatus 140 to the server 120. The receiving apparatus ID is an ID for uniquely identifying the broadcast signal receiving apparatus 140. Therefore, the server 120 can also make, e.g., under control of a system control element 120-4, a CM sending request to the broadcast signal receiving apparatus 140 according to the receiving apparatus ID.

The server for issuing CM 120 generates recommended CM information (CM recommendation or a CM substitute) based on the content ID and the receiving apparatus ID, and sends the recommended CM information to the broadcast signal receiving apparatus 140. The recommended CM is a CM which is supposed to prompt to a viewer of a broadcast signal receiving apparatus with the receiving apparatus ID when the viewer is viewing a program (content) corresponding to the content ID. The server 120 may acquire CM substitute time period information that can be separately used by itself from the broadcast apparatus 100.

First, if the broadcast signal receiving apparatus 140 starts to receive content (program), the recommended CM suitable for the content is pre-loaded and stored in a memory. An original CM (i.e. a CM in a CM time period during which the original CM is allowed to be replaced) in the currently received content (program) is replaced with the recommended CM (CM substitute) temporarily stored in the memory. In other words, the recommended CM (CM substitute) temporarily stored in the memory may be used to replace the original CM in the currently received content (program), where the original CM may be the CM in the time period during which it is allowed to be replaced.

There may be many methods for making a viewer associated with the CM to be prompted to the viewer. For example, a program type, a performer, a view time, etc. viewed by a viewer A are stored as a view log, and data of the view log is analyzed to determine the preference of the viewer A. If the preference of the viewer A is known, a CM which may be suitable for the viewer A can be determined. According to determined information, attribute information of the CM can be set. Therefore, the recommended CM potentially suitable for the viewer A is not limited to one. In some embodiments, when there are a plurality of recommended CMs, priorities may be added to respective recommended CMs.

Herein, the broadcast signal receiving apparatus 140 always sends, e.g., via the network transceiving apparatus 121-4 of the management server 121, the data of the view log to a view log database 121a which stores the view log of the broadcast signal receiving apparatus 140. A CM recommending apparatus 121b determines an attribute of the CM with reference to the viewing log output from the view log database 121a. The attribute of the CM, for example, indicates the type of an object product of the CM, a performer of the CM, etc., and can be flexibly configured via a commercial mode. For example, in the view log database 121a, when a view history is directed to a sports program, the viewer has the preference for sports. In this case, attributes of CM associated with sports wear, CM associated with a baseball field or football field, etc., may be matched with the program (content).

As described above, in the broadcast signal receiving apparatus 140, some of the multiple default CMs contained in a main program are replaced with recommended CMs during a period when CM replacement is allowed.

Herein, replacement with the recommended CM cannot be performed sometimes through delay of a pre-loading timing or channel switching. In other words, in some cases, replacement with the recommended CM cannot be achieved due to delay of the pre-loading timing or channel switching. In addition, a sponsor of the recommended CM also hopes to know view conditions of the recommended CM.

Therefore, the broadcast signal receiving apparatus 140 reports to a CM prompting result management apparatus 121c whether CM prompting acquired from the server 120 succeeds or not.

In addition, the broadcast signal receiving apparatus 140 outputs information about the association between the content ID and the receiving apparatus ID in advance to the server 120. Thus, the server 120 can construct relevant information of the receiving apparatus, content and corresponding CMs.

An example above mentions that the broadcast signal receiving apparatus 140 sends the content ID of the content which starts to receive and the receiving apparatus ID to the server 120 so as to rapidly perform pre-loading. No delay problem exists between the CM recommending apparatus 121b and the server 120 sometimes. In this case, the content ID and the receiving apparatus ID may also be sent to the server 120 via the CM recommending apparatus 121b. In other words, when no delay exists between the CM recommending apparatus 121b and the server 120 sometimes, or in the case that the delay is not considered, the content ID and the receiving apparatus ID may also be sent to the server 120 via the CM recommending apparatus 121b.

Figure 5:
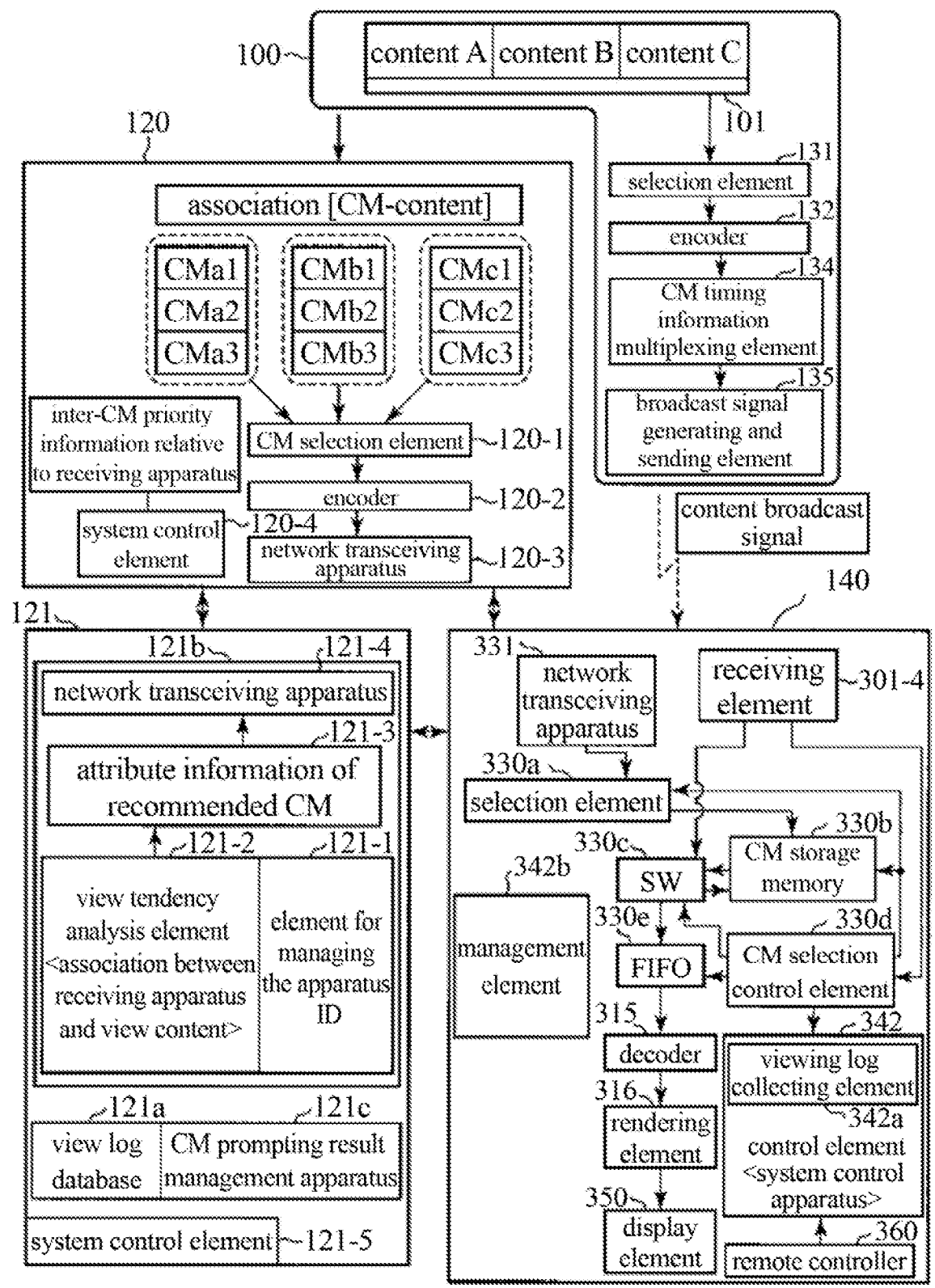
FIG. 5 is a diagram further showing a structure example of some elements in FIG. 4 in detail.

FIG. 5 further shows the CM substitute system of the embodiments in detail.

The broadcast signal receiving apparatus 140 receives and demodulates a broadcast signal via a broadcast receiving element 301-4 (including a tuner, etc.), and outputs a broadcast stream to a selection element 330a. A management element 342b that has received a receiving apparatus ID and a content ID sends the received content ID and receiving apparatus ID to the server 120. In addition, a CM selection control element 330d controls the selection element 330a.

A network transceiving apparatus 331 receives the recommended CM (may also be referred to as the CM substitute) sent by the server 120, and outputs the recommended CM to the selection element 330a. The selection element 330a stores (pre-loads) the recommended CM in a CM storage memory 330b based on a control signal from the CM selection control element 330d.

The CM selection control element 330d controls the CM storage memory 330b, a switch (SW) and an FIFO element (i.e. a first input first output memory). The CM selection control element 330d extracts CM time period information containing a CM replacement allowing time period from service data of the demodulated broadcast signal. In some embodiments, the CM time period information containing the CM replacement allowing time period may be sent with each program, and may also be sent with a program list in advance. The CM time period information containing the CM replacement allowing time period basically may be sent from the management server 121, and may also be sent from the CM insertion server 120.

The CM selection control element 330d stores the CM time period information. If a CM replacement timing is near, CM content for replacement is written into the FIFO element 330e via the switch 330c. In other words, in the FIFO element 330e, the broadcast stream and a recommended CM stream are switched according to a CM switching (replacement) timing. Moreover, the CM selection control element 330d reads the recommended CM stream from the FIFO element 330e during a replacement period, and performs decoding in a decoder 315. A signal output from the FIFO element 330e is prompted in a display apparatus 350 such as a display panel via the decoder 315 and a rendering element 316.

It should be noted that the CM time period information containing the CM replacement allowing time period is read with the broadcast signal by the broadcast signal receiving apparatus 140, or may also be stored in the server (CM insertion server) 120 in advance as information for multiple pieces of content, that is, the CM time period information containing the CM replacement allowing time period may be stored in the server in advance. Moreover, when the server 120 receives the content ID of the content starting to be played by the broadcast signal receiving apparatus 140, the server 120 sends the CM time period information containing the CM replacement allowing time period to the corresponding broadcast signal receiving apparatus.

On the other hand, a system control apparatus 342 controls the CM storage memory 330b and performs collection control over view logs (via view log collecting element 342a). That is, the system control apparatus 342 controls the CM storage memory 330b and controls collection of the view logs via the view log collecting element 342a. The view logs are sent to an external view log database 121a. The view log collecting element 342a can generate a material for determining the CM substitute according to data of the view logs of viewed broadcast content. In addition, a user can assign attribute information of a CM substitute that is intended to be avoided herein. It should be noted that the view log collecting element 342a may be set in an external server (management server 121).

The system control apparatus 342 carries out overall action control on the broadcast signal receiving apparatus according to an operation instruction of an external remote controller 360.

The broadcast apparatus 100 has a content database. In the present embodiments, content A, content B and content C are shown as an example. The broadcast apparatus 100 selects any one of the content A, content B and content C via the selection element 131, performs encoding via an encoder 132, multiplexes CM timing information (CM time period information) via a CM timing information multiplexing element 134, and sends the content as a broadcast signal via a broadcast signal generating and sending element 135, i.e., the content is sent by the broadcast signal generating and sending element 135 in the form of the broadcast signal).

The management server 121 includes a system control element 121-5, basic actions are carried out according to commands of the system control element 121-5. That is, the management server 121 is controlled by the system control element 121-5 via commands, or functions of the management server 121 are achieved via the system control element 121-5.

The management server 121 includes the view log database 121a and a CM prompting result management apparatus 121c. A CM recommending apparatus 121b in the management server 121 includes an element 121-1 for managing the apparatus ID of the broadcast signal receiving apparatus and a view preference analysis element 121-2. In addition, when determining view preference of each broadcast signal receiving apparatus, attribute information, e.g., including a type, a performer, maker preference, etc., or a combination thereof, of the recommended CM associated with the view preference is made (121-3).

There is not just one recommended CM corresponding one broadcast signal receiving apparatus, sometimes there are multiple recommended CMs. In this case, priorities of the multiple recommended CMs are included in attribute information of the multiple recommended CMs. The priorities are determined according to the number of view times, the number of times of view similar content, etc. In some embodiments, an upper quantity limit is set on the multiple recommended CMs. In other words, the priorities of the multiple recommended CMs may be given via the attribute information, and the priorities may be sorted according to the number of view times, the number of times of view the similar content, etc.

In this way, after comparing the receiving apparatus ID, the view content ID, etc. sent from the broadcast signal receiving apparatus 140 with the internal database or making reference to the internal database, a view tendency (preference) of the viewer (the broadcast signal receiving apparatus) is determined. Next, attribute information (such as a type etc.) of a recommended CM analyzed and determined according to the view tendency (preference) is calculated (generated), and is output to the server 120 together with the receiving apparatus ID, the content ID, etc. It should be noted that a view tendency database (viewer preference database) calculates the view tendency of each receiving apparatus by utilizing the view logs, stored in the view log database, of each receiving apparatus.

In the server 120, a pre-determined CM is pre-selected based on the content ID sent from the broadcast signal receiving apparatus 140 and recommended CM attributes corresponding to the content ID acquired from the CM recommending apparatus 121b. In the present embodiments, a CM corresponding to the content A is associated with CMa1, CMa2 and CMa3, a CM corresponding to the content B is associated with CMb1, CMb2 and CMb3, and a CM corresponding to the content C is associated with CMc1, CMc2 and CMc3. These associations are carried out correspondingly to the content ID sent from the broadcast signal receiving apparatus 140. In other words, these associations may be correspondingly achieved by relying on the content ID sent from the broadcast signal receiving apparatus 140. For example, when an ID of the content A is sent from the broadcast signal receiving apparatus 140, a CM that shall be issued to the broadcast signal receiving apparatus 140 is determined by selecting a CM corresponding to the content A from the CMa1, the CMa2 and the CMa3.

In other words, the pre-determined CM is selected via the CM selection element 120-1 according to the content ID and the CM attributes, and the pre-determined CM is sent to the broadcast signal receiving apparatus 140 by an encoder 120-2 and via a network transceiving apparatus 102-3.

Next, actions of each element are further illustrated with reference to FIG. 6, FIG. 7, FIG. 8, FIG. 9A, FIG. 9B and FIG. 10.

Figure 6:
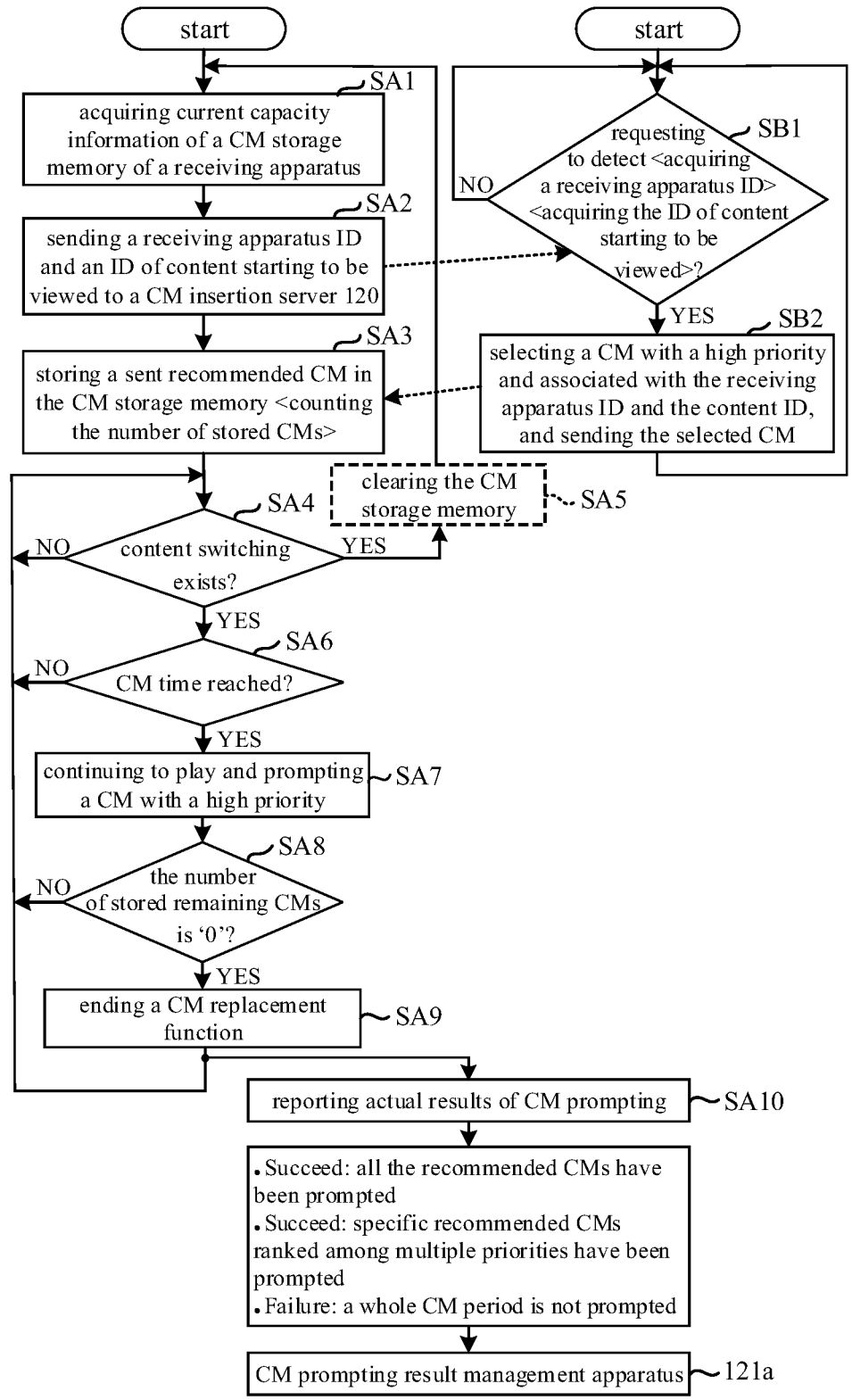
FIG. 6 is a flow chart for illustrating cooperation actions between a broadcast signal receiving apparatus 140 and a server for issuing CM 120 in FIG. 5.

FIG. 6 is a flow chart showing a relationship between the broadcast signal receiving apparatus 140 and the server 120. First, in the broadcast signal receiving apparatus 140, the size (may also be current remaining capacity) of the CM storage memory 330b is calculated (SA1). Then, the broadcast signal receiving apparatus ID and the received content ID are sent to the server 120 (SA2), and a plurality of desired recommended CMs are received and stored (SA3). During storage, the sizes of the recommended CMs are obtained, and multiple recommended CMs corresponding to the calculated size of the CM storage memory 330b of the recommended CM are obtained. In addition, during storage, the number of the CMs is counted (SA3).

As shown in SB1 and SB2, the server 120 sends one or more recommended CMs suitable for the broadcast signal receiving apparatus 140 and the received content to the broadcast signal receiving apparatus 140 in response to a request from the broadcast signal receiving apparatus 140.

The broadcast signal receiving apparatus 140 checks whether content switching exists (SA4). If there is content switching, the flow returns to SA1. In this case, the CM storage memory 330b may be cleared (SA5), or some the recommended CMs may also be reserved. If there is no content switching, whether prompting time of the recommended CMs is reached or not is monitored (SA6). Before the prompting time of the recommended CMs, namely the prompting time of the recommended CMs has not been reached, the flow returns to SA4. If the prompting time of the recommended CMs is reached, a recommended CM with a high priority is played and prompted (SA7). Next, whether the number of the recommended CMs stored in the CM storage memory 330b is "0" or not is checked (SA8). In the case that the number of the stored recommended CMs is "0", a CM replacement is ended (SA9). In the case that there are remaining stored recommended CMs, the flow returns to SA4, and waits until the next CM time period.

The broadcast signal receiving apparatus 140 sends the actual results of CM prompting to the management server 121 (SA10). The content of the actual results may be, for example, that all the recommended CMs have been prompted, or specific recommended CMs ranked among multiple priorities have been prompted, or failure (a whole CM period is not prompted) is prompted, etc.

Figure 7:
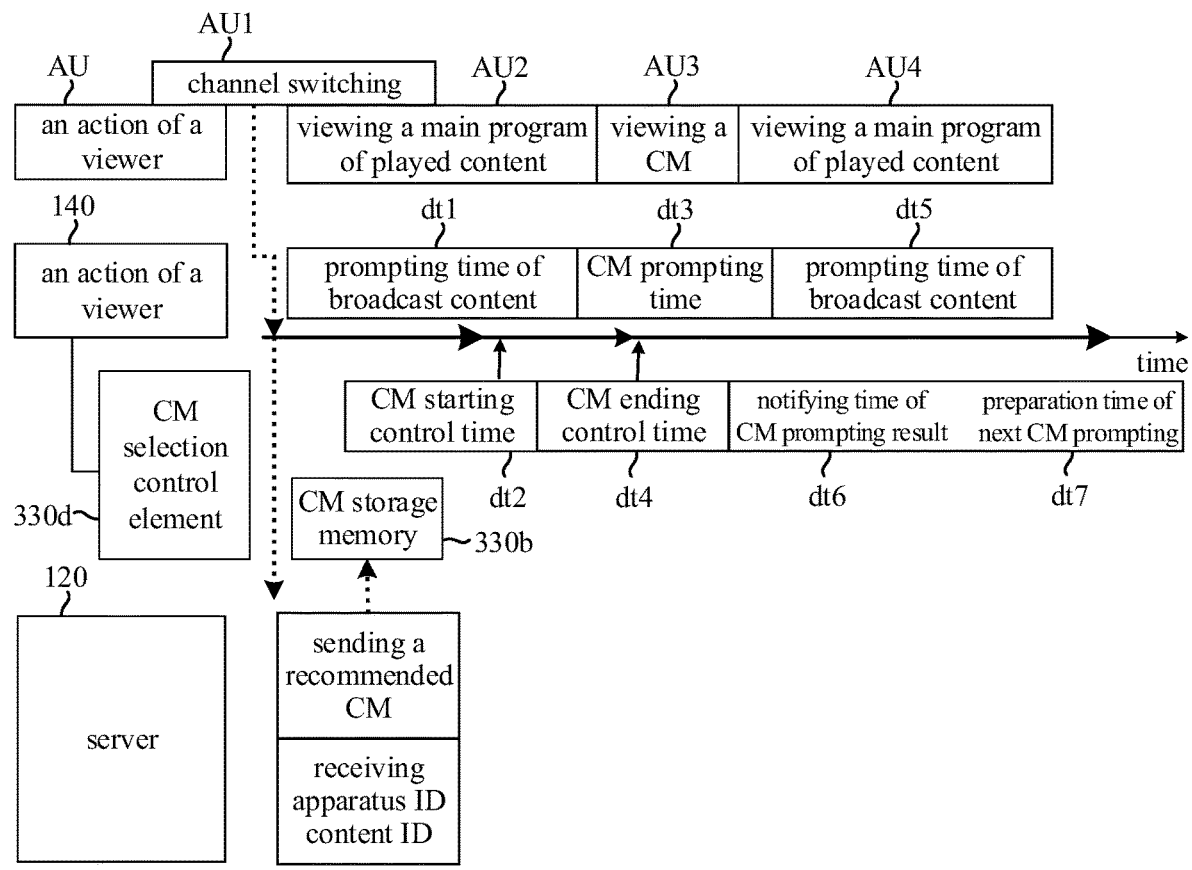
FIG. 7 is a sequence diagram for illustrating actions of prompting content and recommending CMs of the broadcast signal receiving apparatus 140 in FIG. 5.

FIG. 7 shows a sequence diagram of actions such as actions AU of a viewer, actions of the broadcast signal receiving apparatus 140 and actions of the server 120. When the viewer performs channel switching AU1, the broadcast signal receiving apparatus 140 prompts broadcast content of the broadcast station for channel selection. Meanwhile, the broadcast signal receiving apparatus 140 sends the receiving apparatus ID and the content ID to the server 120 and starts to pre-load one or more CMs. Meanwhile, the viewer views a main program of played content (AU2). The one or more pre-loaded CMs are stored in the CM storage memory 330b. A broadcast content prompting time dt1 is switched to the CM stored in the CM storage memory 330b according to a CM starting control time dt2 sent by the broadcast apparatus 100, and CM replacement is prompted. Meanwhile, the viewer views the CM (AU3). Thus, a CM prompting time dt3 state is initiated. In addition, according to a CM ending control time dt4, prompting of the CM from the CM storage memory 330b is ended, and a CM replacement action is completed by returning to a broadcast content prompting time dt5. Meanwhile, the viewer views the main program of the played content (AU4).

At the CM ending control time dt4, a CM prompting result is notified to the CM prompting result management apparatus 121c according to the action illustrated in FIG. 6. If the notification is ended (a CM prompting result notifying time dt6), the broadcast signal receiving apparatus 140 prepares next CM prompting (next CM prompting preparation time dt7), and a CM substitute with a high priority for next prompting is set in the CM storage memory 330b.

Figure 8:
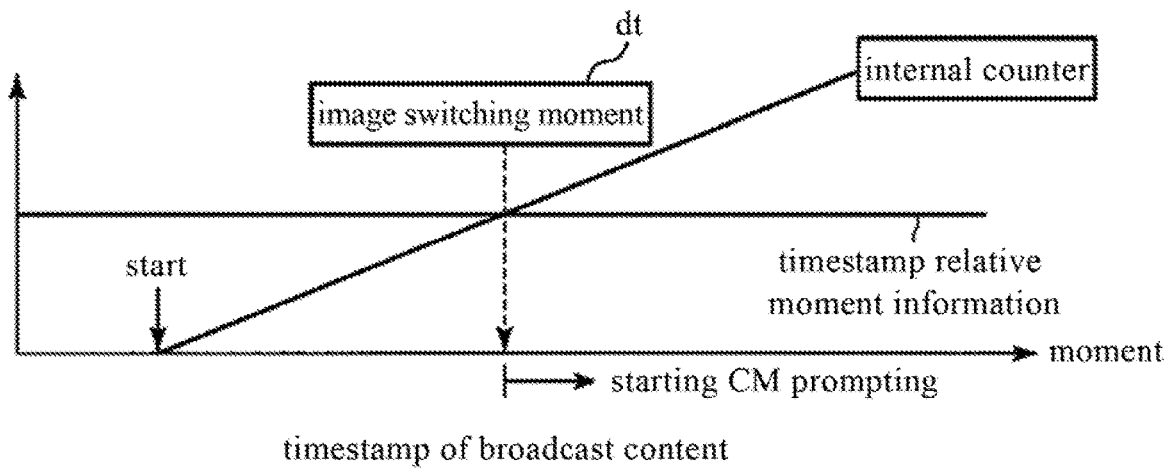
FIG. 8 is a sequence diagram illustrating a timing for switching to prompt a recommended CM at a broadcast signal receiving apparatus of the embodiments.

FIG. 8 is a diagram for illustrating CM starting control and CM ending control that control a CM prompting timing. The broadcast apparatus 100 sends a timestamp of a broadcast content included in a broadcast signal. In addition, the broadcast apparatus 100 sends information, shown at a relative moment from a content starting time point, sent at the CM prompting timing on the basis of the timestamp.

The broadcast signal receiving apparatus 140 synchronizes its internal counter with a timestamp from the broadcast apparatus 100. The internal counter may also be referred to as an internal timer and is configured to realize timestamp synchronization. Moreover, when the internal counter counts to reach a relative moment (an image switching time point dt) serving as the CM prompting timing, a switching timing signal is generated. The timing (moment) is equivalent to the CM starting control time dt2 for video switching in FIG. 7. In this action, switching with good precision can be realized because the internal counter of the broadcast signal receiving apparatus 140 is synchronized to the timestamp of the broadcast apparatus 100. Through the same action, the CM ending control time dt4 may also be determined, and a corresponding signal is generated.

(Whether to perform) a switching action is determined by comparing the video switching time dt with a value included in the CM substitute time period information. Thus, whether to output a default CM included in a main program or a CM substitute can be randomly controlled.

Figure 9A:
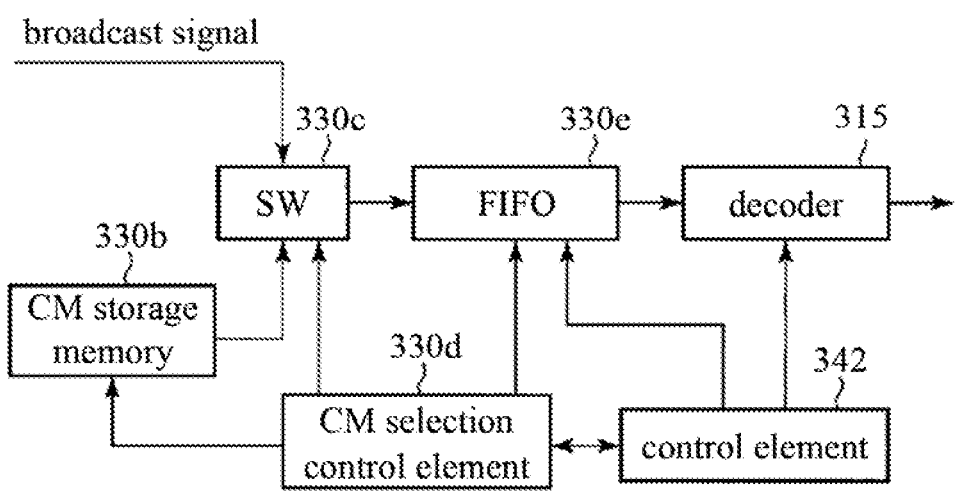
FIG. 9A is a structure in a broadcast signal receiving apparatus of the embodiments, and is a diagram for showing a circuit example for switching between a recommended CM and main program content.
Figure 9B:
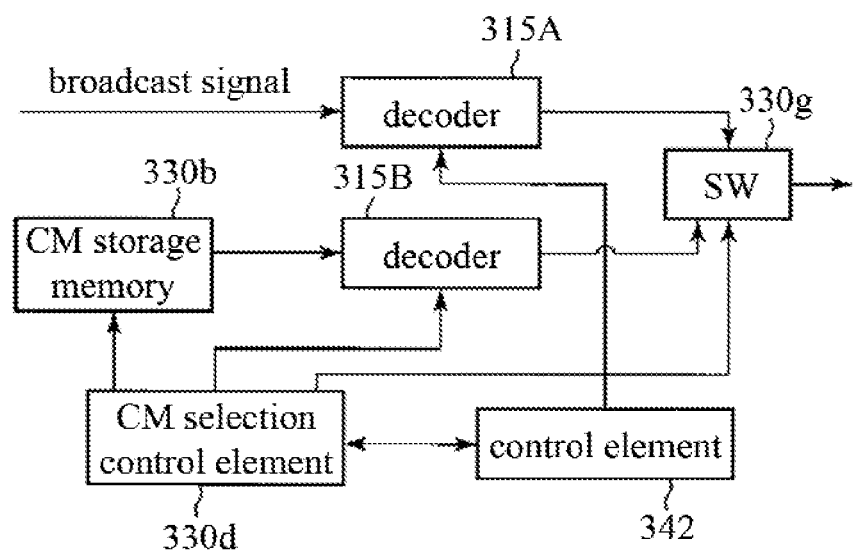
FIG. 9B is structure in a broadcast signal receiving apparatus of the embodiments, and is a diagram for showing another circuit example for switching between the recommended CM and the main program content.

FIG. 9A and FIG. 9B show a circuit module for switching a main program of content and a CM substitute. In an embodiment of FIG. 9A, in the period other than the CM substitute period, a broadcast signal is decoded along the path of the switch 330c, the FIFO element 330e and the decoder 315. Thanks to the switch control of the switch 330c, the CM selection control element 330d performs control in the CM substitute period so as to write one or more CMs read from the CM storage memory 330b into the FIFO element 330e and read the one or more CMs. On the contrary, in the period other than the CM substitute period, the CM selection control element 330d performs control so as to write the broadcast content contained in the broadcast signal into the FIFO element 330e and read the broadcast content. The control element 342 controls starting of an action of the FIFO element 330e and a decoding action of the decoder 315. The CM selection control element 330d controls the switch SW based on CM starting control information and CM ending control information. The CM starting control information and the CM ending control information are read from the CM substitute time period information according to a time sequence.

In the embodiment shown in FIG. 9A, decoding of the CM substitute and decoding of the main program of the broadcast content are performed by the same decoder 315. As shown in FIG. 9B, decoders 315A and 315B are prepared for decoding the broadcast content and the CM substitute. The decoders 315A and 315B perform decoding by frame synchronization.

The decoder 315A decodes the broadcast content in sequence. Therefore, the default CM contained in the broadcast content is also decoded and output. In another aspect, the decoder 315B decodes content of the CM substitute read from the CM storage memory 330b.

In this case, the CM selection control element 330d, for example, may control to decode the CM substitute one or more frames ahead, and performs circulation in a frame memory (not shown). Moreover, a switch 330g may be controlled based on the CM starting control information and the CM ending control information to achieve CM replacement.

Figure 10:
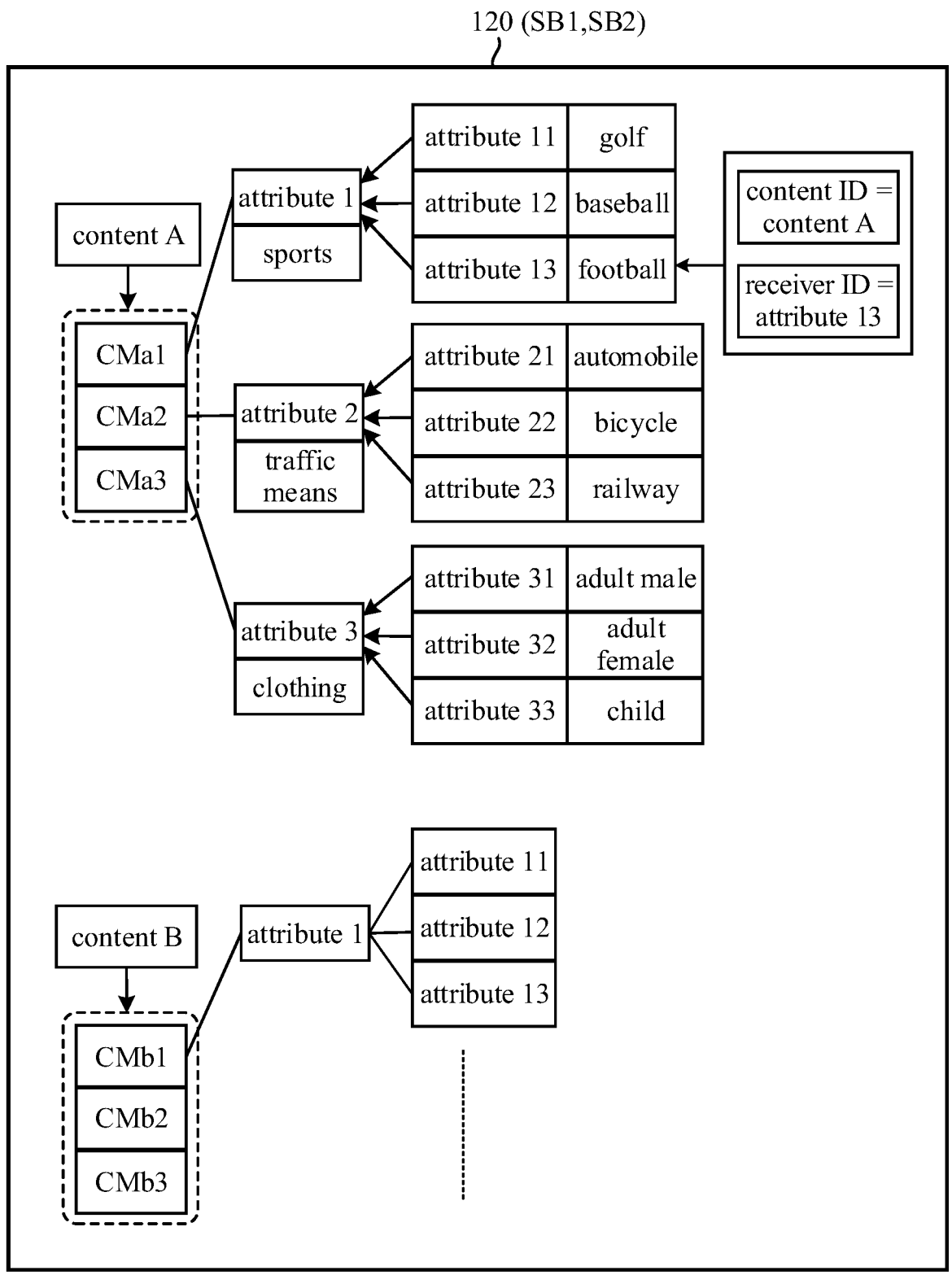
FIG. 10 is an illustration diagram showing an example of a logic method used for selecting a recommended CM suitable for a viewer in a system of the embodiments.

For example, FIG. 10 shows preferential CMs assigned based on the content in the server 120. CMs for the content A, CMa1, CMa2 and CMa3 are associated, and CMs for the content B, CMb1, CMb2 and CMb3 are associated. Herein, the CMa1 has an attribute 1 (sports), the CMa2 has an attribute 2 (transportation means), and the CMa3 has an attribute 3 (clothing). In addition, the attribute 1 (sports) is classified further and is associated with an attribute 11 (golf), an attribute 12 (baseball) and an attribute 13 (football). In addition, the attribute 2 (transportation means) is classified further and is associated with an attribute 21 (automobile), an attribute 22 (bicycle) and an attribute 23 (railway). In addition, the attribute 3 (clothing) is classified further and is associated with an attribute 31 (adult male), an attribute 32 (adult female) and an attribute 33 (child). Similarly, CMb1, the CMb2 and the CMb3 for the content B are also associated.

For example, the CM associated with the content A is associated with a CM which is associated with content that becomes a topic in the content A. The content A, for example, may be a following story: a character X who likes sports chases a player Y with a luxury car to reach a match field, and the character X gives the player Y various clothes.

In this case, for example, a viewer AU receives and watches the content A. In addition, on the basis of information such as view logs associated with the viewer AU, it is determined that the attribute 13 is recommended as the attribute of the receiving apparatus of the viewer AU, that is, on the basis of the information such as the view logs associated with the viewer AU, the attribute 13 is recommended to the receiving apparatus of the viewer AU. Therefore, the server 120 sends a CM substitute corresponding to the content ID (corresponding to the content A), the receiving apparatus ID and the attribute 13 to the receiving apparatus of the viewer. That is, the content ID, ID of the receiving apparatus and CM substitute corresponding to attribute 13 are sent to the receiving apparatus of the viewer. In the above example, the CM substitute is related to football, such as CM of clothing, shoes, balls, football fields, etc., for football. As described above, the CM substitute associated with the broadcast content is determined from CMs which are determined based on the preference of the viewer and the similarity between the CMS and the preference, where the preference of the viewer is based on an analysis result of a view history of the broadcast content, and the similarity between the CMs and the preference should be high or the distance between the CMs and the preference should be close. That is, the CM substitute associated with the broadcast content is determined from CMs which are determined according to the preference (based on the analysis result of the viewing history of the broadcast content) of the viewer and the similarity between the CMs and the preference (should be high similarity or close distance).

Next, multiple concepts included in the above embodiments are recorded below.

<concept A> (A1), as shown in FIG. 5, the broadcast signal receiving apparatus includes: a receiving element 301-4, configured to receive and demodulate a broadcast content; a view log collecting element 342a, configured to generate view history of the broadcast content; a CM substitute time period information acquisition element, configured to acquire one or more specific assigned time periods for CM substitutes among the CM time periods during the playing of the broadcast content; a CM storage memory 330b, configured to acquire the CM substitute associated with the broadcast content from an external element; and a switch 330c, configured to select the CM substitute for playing in the specific assigned period based on the CM substitute time period information. A priority is given to the CM substitute based on the similarity between CM attributes and view tendency which is analyzed by using view history, that is, the CM substitute is determined based on the view history, and the priority of the CM substitute is given based on the similarity between the view tendency and the CM attributes.

According to the above concept A1, an addressable CM is prompted effectively and efficiently. In order to achieve the above prompting, the viewing tendency of each broadcast signal receiving apparatus may be analyzed by utilizing the analysis result of the view logs output from the broadcast signal receiving apparatus so as to select and provide the CM for the broadcast signal receiving apparatus. In other words, the CM with a high priority is prompted by calculating the distance (similarity judging) between the view tendency and the CM attribute information. In addition, the similarity between the CM attribute information and attributes of the broadcast content (main program) is determined, and the CM substitute is prompted to each receiving apparatus, so that the CM substitute better suitable for the viewer can be provided (e.g., with reference to FIG. 10).

In this way, the broadcast content (main program) is associated with the prompted CMs, that is, the actually played CM can be associated with the broadcast content (main program). In addition, the CM that shall be prompted is recommended in the CMs associated with the main program content, and therefore a CM provider is in a way to easily reflect advertising intentions, that is, the CM provider can easily reflect the advertising intentions. In addition, the distance between the CM attribute information and viewer side attribute information calculated according to the view tendency based on the view logs is calculated (similarity determination), and based on the similarity, replacement, addition, deletion, etc. of the CMs can be flexible.

In addition, time for CM replacement may be selected. In other words, a time for a next CM substitute can also be set according to scenarios of the broadcast content. For example, when content of a scenario is about tasting luxury delicious food in a restaurant, a CM substitute of restaurants at the street where a viewer is located can be inserted. Furthermore, when preferred cuisine and disliked food are known according to a questionnaire, etc. obtained from the viewer, a CM substitute of restaurants with liked food can be provided.

(A2), in the above concept (A1), the CM time period information acquisition element acquires the CM substitute time period information from an external server.

(A3), in the above concept (A1), the CM substitute acquisition element acquires multiple CM substitutes with priorities.

(A4), in the above concept (A1), the CM substitute associated with the broadcast content is selected from CMs which are determined according to the preference of the viewer and the similarity between the CMs and the preference, where the preference of the viewer is based on an analysis result of a view history of the broadcast content. That is, the CM substitute associated with the broadcast content is selected from CMs which are determined according to the preference (based on the analysis result of the view history of the broadcast content) of the viewer and the similarity (may be high similarity or close distance) between the attributes of the CMs and the attributes of the preference.

(A5), in the above concept (A1), the CM substitute associated with the broadcast content is selected from CMs which are determined according to the preference of the viewer and attributes associated with the preference, where the preference of the viewer is based on an analysis result of a view history of the broadcast content. That is, the CM substitute associated with the broadcast content is selected from CMs which are determined according to the preference (based on the analysis result of the view history of the broadcast content) of the viewer and attributes (may be high similarity or close distance) associated with the preference.

<concept B> (B1), in the above concept (A1), for example, as shown in FIG. 5, FIG. 7 and FIG. 8, the control switch 330c is controlled by the CM selection control element 330d to select any one of the CM substitute and the main program. The CM selection control element 330d acts based on the CM substitute time period information. Thus, the switch 330c selects the CM substitute for playing in the specific assigned period.

In this case, the internal counter of the broadcast signal receiving apparatus 140 synchronizes with a relative timestamp (relative time information) sent with the broadcast content. Moreover, in the concept B1, the CM selection control element 330d meets that: cause to start the prompting of the CM substitute when the internal counter reaches a CM substitute start point in the CM substitute time period information, and end the prompting of the CM substitute when the internal counter reaches a CM substitute end point in the CM substitute time period information. That is, the CM substitute starts to prompt when the internal counter reaches a CM substitute start point in the CM substitute time period information, and the CM substitute ends prompting when the internal counter reaches the CM substitute end point in the CM substitute time period information.

When the broadcast content is switched from the main program to the CMs, dynamic images may be received from servers and the received dynamic images may be prompted, but this may cause obvious deterioration due to discontinuous images during switching.

According to the above concept (B1), the CM substitutes are acquired and cached in the CM storage memory 330b of the broadcast signal receiving apparatus, so that the program content and the CM substitutes acquired from servers can be smoothly switched. Through cooperation with a CM switching timing, prompting is performed from a memory of a receiver, so that the continuity of the dynamic images has no obvious deterioration. The switching timing also uses an internal counter at the receiver side which synchronizes with the time in digital broadcast from broadcast sending side, thereby improving the precision of the switching timing.

(B2), in the above concept (B1), an element is configured to: as the CM substitute end point in the CM substitute time period information arrives, whether CM prompting succeeds or not is reported to an external server.

(B3), in the above concept (B1), before and during pre-loading of the CM substitute, the capacity of the CM storage memory 330b is reported to the management server 121 or the insertion server 120. The report may be performed by either the CM selection control element 330d, or the system control element 342.

Therefore, when the remaining capacity of the CM storage memory 330b is small and when the number of CMs or the amount of data pre-loaded from the server 120 is large, the CM selection control element 330d or the system control element 342 may stop (suspend) pre-loading.

Alternatively, the capacity of the CM storage memory 330b is reported to the management server 121 or the insertion server 120 every pre-loading through the CM selection control element 330d or the system control element 342, and the management server 121 or the insertion server 120 may decide stopping (suspending) of pre-loading. This is effective when many CM substitutes are prepared in the CM substitute issue server 120.

<Concept C> (C1), in the above concept B1, the CM substitute time period information acquisition element acquires the CM substitute associated with the broadcast content from an external element, but before the acquisition, the network transceiving apparatus 331 sends the current remaining capacity of the CM storage memory 330b to the server 120. The server 120 meets that: when there are a plurality of CM substitutes that shall be prompted to the broadcast signal receiving apparatus 140, content of the CM substitutes matching with the current remaining capacity is sent to the broadcast signal receiving apparatus 140 from high priority to low priority.

This can also be realized from the broadcast signal receiving apparatus 140. The broadcast signal receiving apparatus 140 includes: a receiving element, configured to receive and demodulate a broadcast content; a CM substitute time period information acquisition element, configured to acquire, specific assigned time periods for CM substitutes among the CM time periods during the playing of the broadcast; and a CM substitute storage memory, configured to acquire and store a CM substitute associated with the broadcast content and associated with the preference of the viewer from an external element. The broadcast signal receiving apparatus 140 further includes a CM selection element, configured to play the CM substitutes in the assigned periods of the CM substitutes based on the CM substitute time period information. In addition, the broadcast signal receiving apparatus 140 further includes a control element, configured to monitor the remaining capacity of the CM substitute storage memory before the CM substitute is acquired, and store the CM substitutes with the high priority when the CM substitute is stored in the CM substitute storage memory.

Usually, when multiple CMs are stored as dynamic image content, a memory with a large-capacity is required. In the present way, a small-capacity memory can be utilized by carrying out pre-loading at server side during channel switching. In addition, the number of stored CMs can be flexibly and easily set by pre-determining the size of the storage memory on the broadcast signal receiving apparatus.

On the other hand, if pre-loading fails, prompting failure of CMs will be acquired by the server. But at this time, by prompting (playing) the default CMs inserted in the broadcast content, image quality decrease for the viewer will not occur. In addition, it is easy to create a business mode if the advertisement releasing party receives notifications about whether CM prompting succeeds or fails. Although this is a way to make the best of the current situation, the dynamic images will not deteriorate, and there are no unfavorable effects for the viewer.

It should be noted that the priority of the CM substitute can also be given according to intentions of the CM Company and a CM provider. For example, the priority of a CM that a viewer of a specific program wants to view can be increased. In addition, the priority can also be adjusted according to seasons.

(C2), in the above concept C1, when the CM storage memory 330b cannot store content of even one CM substitute, the broadcast signal receiving apparatus is notified that the CM substitute cannot be sent. That is, when the remaining storage capacity of the CM storage memory 330b is not enough to store the content of one CM substitute, the broadcast signal receiving apparatus may be notified that the CM substitute cannot be sent. In this case, the broadcast signal receiving apparatus 140 does not implement CM replacement processing, but plays the default CM sent together with the broadcast signal.

(C3), the remaining capacity of the CM storage memory is notified to the external server, the external server sends information related to processing of the CM substitute, and a receiving side acts based on the information related to the processing. For example, only the CM substitutes with the high priority are stored, or the CM substitute is not stored but the default CM contained in the playing broadcast signal is played.

It should be noted that in the structure example of the addressable CM system shown in FIG. 1, the following condition is taken as an example: the broadcast station (broadcast signal sending apparatus) 100 sends the broadcast wave multiplexed according to MMT/TLV protocol, and the broadcast signal receiving apparatus 140 receives the broadcast wave multiplexed according to MMT/TLV protocol; however, the broadcast wave may also be multiplexed according to MPEG-2protocol. Alternatively, in the structure example of the addressable CM system shown in FIG. 1, the broadcast station (broadcast signal sending apparatus) 100 may broadcast the program content to the broadcast signal receiving apparatus 140 via the network 130. In other words, the broadcast content illustrated in the present disclosure may also be broadcast content sent in a network TV broadcast (IP broadcast) other than terrestrial waves and satellite waves.

In addition, the structure example of the addressable CM system shown in FIG. 1 is an example that only includes one broadcast signal receiving apparatus 140, but may also include a plurality of broadcast signal receiving apparatuses 140. In this case, the management server 121 may identify and manage the plurality of broadcast signal receiving apparatuses 140 by utilizing the device ID of each broadcast signal receiving apparatus 140.

In addition, it is illustrated that the CM replacement apparatus 330 in the embodiment of the present disclosure is included (disposed) in the broadcast signal receiving apparatus 140, but may also be included (disposed) in a separate apparatus which can communicate with the broadcast signal receiving apparatus 140 and can identify each broadcast signal receiving apparatus 140 via its device ID.

In this case, any one of the management server 121, the server 120, etc. may also prepare CM replacement allowance time period information (information of a time period when CM replacement is allowed). In addition, the broadcast signal receiving apparatus 140 may have a function which allows a user to block CM replacement processing via certain operations. Additionally, a function that a representative image, for example, of the CM substitute is displayed in the display element 350 may be set. In addition, when representative images of a plurality of CM substitutes are displayed, a user can select by operations on buttons for the options "CM replacement enabled", "CM replacement disabled" assigned to representative images, etc. Further, a function of displaying a message for notifying that the CM substitutes exist may be set when the CM substitutes are displayed.

DESCRIPTION OF REFERENCE NUMBERS

100—broadcast station (broadcast signal sending apparatus), 120—server for issuing CM (CM insertion server), 12—management server, 140—broadcast signal receiving apparatus, 160—recording medium, and 330—CM replacement apparatus.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An apparatus, comprising:
a receiving element, configured to receive and demodulate a broadcast content including a default CM and a CM prompting timing, wherein the CM prompting timing is a signal for indicating a prompting time of the default CM comprised in the broadcast content and indicating a time period in which a CM substitute is able to be inserted;
a first decoder, configured to decode the broadcast content including the default CM;
a management element, configured to send a received content ID of the broadcast content and a receiving apparatus ID of the apparatus to an external server, to enable the external server to generate a CM substitute based on the received content ID and the receiving apparatus ID and send the CM substitute to a network transceiving device of the apparatus;
the network transceiving device, configured to receive the CM substitute sent from the external server and output the CM substitute to a CM selection control element of the apparatus, wherein the CM substitute is pre-loaded before the receiving element starts to receive the broadcast content;
a second decoder, configured to decode the CM substitute;
a CM substitute time period information acquisition element, configured to acquire a specific assigned time period information for the CM substitute among one or more CM periods from the CM selection control element during the playing of the broadcast content;
a CM substitute storage memory, configured to acquire the CM substitute associated with the broadcast content and associated with a preference of a viewer from the CM selection control element and store the acquired CM substitute;
the CM selection control element, configured to control the second decoder to decode the CM substitute one or more frames ahead, and perform circulation in a frame memory;

a switch, configured to achieve CM replacement between the default CM and the CM substitute based on CM starting control information and CM ending control information;

a CM selection element, configured to play the CM substitute in a specific assigned time period based on the specific assigned time period information for the CM substitute; and a control element, configured to monitor remaining capacity of the CM substitute storage memory, and store a CM substitute with a high priority while the CM substitute is stored in the CM substitute storage memory.

2. The apparatus according to claim 1, wherein the CM substitute is sent from the external server based on the remaining capacity of the CM substitute storage memory.

3. The apparatus according to claim 1, wherein the control element is further configured to monitor the remaining capacity of the CM substitute storage memory, and store the CM substitute with higher priorities when the remaining capacity is not enough to store all CM substitutes.

4. The apparatus according to claim 1, wherein the apparatus further comprises a counter which synchronizes with a timestamp within the broadcast content.

5. The apparatus according to claim 1, wherein the apparatus further comprises: an element configured to: as a CM substitute end point in the specific assigned time period information for the CM substitute arrives, report whether CM prompting succeeds or not to the external server.

6. The apparatus according to claim 1, wherein the control element is further configured to report the remaining capacity of the CM storage memory before and during pre-loading of the CM substitute.

7. The apparatus according to claim 1, wherein the apparatus further comprises an element configured to: when the remaining capacity of the CM substitute storage memory is not enough to store a content of one CM substitute, receive a notification that the CM substitute cannot be sent and cause the apparatus to play the default CM sent together with the broadcast content.

8. A method comprising:

receiving and demodulating a broadcast content including a default CM and a CM prompting timing, wherein the CM prompting timing is a signal for indicating a prompting time of the default CM comprised in the broadcast content and indicating a time period in which a CM substitute is able to be inserted;

decoding the broadcast content including the default CM;

sending a received content ID of the broadcast content and a receiving apparatus ID of an apparatus to an external server, to enable the external server to generate a CM substitute based on the received content ID and the receiving apparatus ID and sending the CM substitute to a network transceiving device of an apparatus;

receiving the CM substitute sent from the external server and outputting the CM substitute to a CM selection control element of the apparatus, wherein the CM substitute is pre-loaded before a receiving element of the apparatus starts to receive the broadcast content;

decoding the CM substitute;

acquiring a specific assigned time period information for the CM substitute among one or more CM periods from the CM selection control element during the playing of the broadcast content;

acquiring the CM substitute associated with the broadcast content and associated with a preference of a viewer of the CM selection control element of the apparatus from the external server, and storing the acquired CM substitute;

achieving CM replacement between the default CM and the CM substitute based on CM starting control information and CM ending control information;

playing the CM substitute in a specific assigned time period based on the specific assigned time period information for the CM substitute; and monitoring remaining capacity of a CM substitute storage memory of the apparatus, and storing a CM substitute with a high priority while the CM substitute is stored in the CM substitute storage memory.

9. The method according to claim 8, further comprising:
acquiring the CM substitute sent from the external server based on the remaining capacity of the CM substitute storage memory.

10. The method according to claim 8, further comprising:
monitoring the remaining capacity of the CM substitute storage memory; and
storing the CM substitute with higher priorities when the remaining capacity is not enough to store all CM substitutes.

11. The method according to claim 8, further comprising:
reporting whether CM prompting succeeds or not to an external server in response to an arrival of a CM substitute end point in the specific assigned time period information for the CM substitute.

12. The method according to claim 8, further comprising:
reporting the remaining capacity of the CM storage memory before and during pre-loading of the CM substitute.

13. The method according to claim 8, further comprising:
in response to the remaining capacity of the CM substitute storage memory being not enough to store a content of one CM substitute, receiving a notification that the CM substitute cannot be sent and causing the apparatus to play the default CM sent together with the broadcast content.

* * * * *